US012055758B2

(12) United States Patent
Karabchevsky et al.

(10) Patent No.: US 12,055,758 B2
(45) Date of Patent: Aug. 6, 2024

(54) STRUCTURE FOR A WAVEGUIDE FACET

(71) Applicant: B.G. NEGEV TECHNOLOGIES & APPLICATIONS LTD., AT BEN-GURION UNIVERSITY, Beer-Sheva (IL)

(72) Inventors: Alina Karabchevsky, Lehavim (IL); Joseph Gurwich, Beer-Sheva (IL)

(73) Assignee: B.G. NEGEV TECHNOLOGIES & APPLICATIONS LTD., AT BEN-GURION UNIVERSITY, Beer-Sheva (IL)

( * ) Notice: Subject to any disclaimer, the term of this patent is extended or adjusted under 35 U.S.C. 154(b) by 308 days.

(21) Appl. No.: 17/426,005

(22) PCT Filed: Dec. 29, 2019

(86) PCT No.: PCT/IL2019/051425
§ 371 (c)(1),
(2) Date: Jul. 27, 2021

(87) PCT Pub. No.: WO2020/157741
PCT Pub. Date: Aug. 6, 2020

(65) Prior Publication Data
US 2022/0120969 A1  Apr. 21, 2022

Related U.S. Application Data

(60) Provisional application No. 62/797,381, filed on Jan. 28, 2019.

(51) Int. Cl.
G02B 6/26 (2006.01)
G02B 1/118 (2015.01)
G02B 6/122 (2006.01)

(52) U.S. Cl.
CPC ............. *G02B 6/262* (2013.01); *G02B 1/118* (2013.01); *G02B 6/1223* (2013.01)

(58) Field of Classification Search
CPC ......... G02B 6/262; G02B 6/264; G02B 1/118
See application file for complete search history.

(56) References Cited

U.S. PATENT DOCUMENTS 5,602,947 A * 2/1997 Neuberger ........... G02B 6/4207
359/622
6,483,635 B1 * 11/2002 Wach .................... H01S 5/1082
359/344

(Continued)

FOREIGN PATENT DOCUMENTS

EP    0 952 470    10/1999
EP    2 942 819    11/2015

(Continued)

OTHER PUBLICATIONS

J. H. Schmid et al. Subwavelength grating structures in silicon-on-insulator waveguides. Advances in Optical Technologies, vol. 2008, Jul. 2008. (https://doi.org/10.1155/2008/685489) (Year: 2008).*

(Continued)

*Primary Examiner* — Michael Stahl
(74) *Attorney, Agent, or Firm* — Nixon & Vanderhye PC

(57) ABSTRACT

The invention relates to an input or output facet for an on-chip optical waveguide, the facet comprising a grid of gradually expanding unit-cells such as cones or pyramids.

14 Claims, 9 Drawing Sheets

(56) References Cited

U.S. PATENT DOCUMENTS

| | | | |
|---|---|---|---|
| 8,647,903 B2* | 2/2014 | Lee | G02B 5/1857 438/32 |
| 2005/0185915 A1* | 8/2005 | Yu | G02B 6/0016 385/37 |
| 2008/0193080 A1 | 8/2008 | Cheben et al. | |
| 2010/0259823 A1* | 10/2010 | Xi | G02B 1/118 216/13 |
| 2010/0290118 A1* | 11/2010 | Yamada | A01K 63/003 359/609 |
| 2011/0033156 A1* | 2/2011 | Sanghera | B29D 11/00682 264/2.7 |
| 2011/0103418 A1* | 5/2011 | Hardy | B82Y 20/00 372/44.01 |
| 2011/0235181 A1 | 9/2011 | Hayashibe et al. | |
| 2012/0146044 A1 | 6/2012 | Gmeinwieser et al. | |
| 2013/0083402 A1* | 4/2013 | Sanghera | G02B 6/255 359/601 |
| 2023/0034350 A1* | 2/2023 | Karabchevsky | G02B 6/4207 |

FOREIGN PATENT DOCUMENTS

| | | | |
|---|---|---|---|
| JP | 2006-133617 A | * | 5/2006 |
| JP | 2008-258274 | | 10/2008 |

OTHER PUBLICATIONS

Y. Wang et al. Light extraction enhancement in GaN-based vertical light-emitting diodes with hemispherical bumps. Journal of Vacuum Science & Technology B, 32:5:051804, Aug. 25, 2014. (https://doi.org/10.1116/1.4893437) (Year: 2014).*

A. O. Dirisu et al. Reduction of facet reflectivity of quantum-cascade lasers with subwavelength gratings. IEEE Photonics Technology Letters, 19:4:221, Feb. 15, 2007. (https://doi.org/10.1109/LPT.2006.890755). (Year: 2007).*

Extended European Search Report issued on Sep. 5, 2022 in corresponding European Application No. 19913306.7, 7 pages.

International Search Report issued in PCT/IL2019/051425 dated Mar. 30, 2020 (4 pages).

Written Opinion of the International Searching Authority issued in PCT/IL2019/051425 dated Mar. 30, 2020 (4 pages).

* cited by examiner

STRUCTURE FOR A WAVEGUIDE FACET

This application is the U.S. national phase of international Application No. PCT/IL2019/051425 filed Dec. 20, 2019 which designated the U.S. and claims priority to U.S. Provisional Application No. 62/797,381 filed Jan. 28, 2019, the entire contents of each of which are hereby incorporated by refererence.

FIELD OF THE INVENTION

The invention relates in general to the field of optical components. More specifically, the invention relates to the field of optical waveguides.

BACKGROUND OF THE INVENTION

Passive optical waveguides are widely used for transferring optical signals between two physical locations. One type of such optical waveguides is the on-chip waveguide. A single semiconductor chip having an area of several cm$^2$ (or even less) can contain up to several hundreds of optical waveguides. Such chips are typically used in cameras, telescopes, multiplexers, devices that include on-chip laser, filters, light sources, amplifiers and other optical devices. The fact that an optical waveguide is embedded within a semiconductor chip limits the waveguide-materials that can be used to materials that are commonly used in the semiconductor industry. For example, it is common in the semiconductor industry to make the core of the on-chip waveguide from materials such as Silicon, Silicon-Nitride, Gallium Arsenide, etc., that are substantially transparent in the relevant light spectra, and can also be manipulated to perform various features. For example, the use of such materials at the core of the waveguide allows adding to the waveguide capabilities such as switching, multiplexing, division, mode conversion etc. While all these materials have a refractive index higher than the refractive index (1.0) of air, which is a requirement to allow signal transfer through the waveguide, their refractive index is in fact significantly higher than of the air. As a result of the very high refractive index of the semi-conductor core materials, such on-chip waveguides suffer from a drawback of a very low efficiency. More specifically, the refractive index of Silicon and Gallium-Arsenide is about 4.0, and of Silicon-Nitride about 2.0, causing the optical signal to lose about 35% of its energy at the inward transition from the air medium to the core material of the waveguide, in view of Fresnel reflections. The transferred signal loses additional 35% of its energy at the outward transition from the core of the waveguide to the air, due to similar reasons. In total, while passing through the waveguide, the optical signal loses about 51% of its energy just due to these air-core material transitions. Clearly, such losses are very significant, and result from the natural properties of the materials that are used. It should be noted that the above efficiency problem is typical only to on-chip waveguides, in view of the materials that are typically used in the core of the waveguide. Conventional optical waveguides (i.e., those that not designed for on-chip use), such as passive fiber-optics that typically use silica glass at their core, lose only about 4% of the signal energy at the transition from the air to the fiber-optic glass-core, and vice versa, therefore this efficiency problem is much less significant in those passive conventional fiber-optics or waveguides.

One typical prior art solution to the abovementioned efficiency problem suggests applying of coating made of materials such as, Aluminum, Aluminum-Oxide, Barium-Fluoride, Calcium-Fluoride, Cerium (IV) Oxide, etc. to the input and output facets of optical elements. Such a solution typically reduces reflections in a specific spectrum. However, it is substantially impossible to apply coating to such tiny-polished surfaces of on-chip waveguide facets, and thereby to avoid reflection. The coating, even if somehow successfully applied to a waveguide facet, seems problematic for still another reason—coating in general tends to separate from the coated material, a situation, when occurs, significantly damages the performance of the component. This situation is particularly noticeable in environments of high-acceleration, high temperature, large-pressure or environmental stress variations, such as in airplanes, satellites, high-power devices, and space stations. Therefore, another solution is clearly desired for on-chip waveguides.

Moreover, the typical prior art on-chip waveguides are narrow-band devices, namely, they are dedicated to operate in a narrow bandwidth (for example, near infrared). It is desired to provide a significantly broader-band on-chip optical waveguide compared to the prior art. It is also desired to provide this broadband waveguide with an improved transfer efficiency compared to prior art waveguides.

It is therefore an object of the invention to provide means for improving the efficiency of waveguides, particularly on-chip waveguides having semiconductor materials at their core.

It is another object of the invention to provide a broadband on-chip waveguide.

Other objects and advantages of the invention will become apparent as the description proceeds.

SUMMARY OF THE INVENTION

The invention relates to an input or output facet for an on-chip optical waveguide, the facet comprising a grid of gradually expanding unit-cells.

In an embodiment of the invention, each of the gradually expanding unit cells expands in the direction from the outer of the waveguide towards the interior of the waveguide.

In an embodiment of the invention, the gradually expanding unit cells are selected from a group comprising cones or pyramids.

In an embodiment of the invention, the gradually expanding unit cells are cones, pyramids, or a combination thereof.

In an embodiment of the invention, the gradually expanding unit cells are selected from the group comprising truncated cones, hemispherical cones, and parabolic cones.

In an embodiment of the invention, the unit cells are arranged on the facet in a staggered grid form.

In an embodiment of the invention, the unit cells are arranged on the facet in a linear grid form.

In an embodiment of the invention, the gradually expanding unit cells are engraved on the facet.

In an embodiment of the invention, the engravement of the gradually expanding unit cells is performed by a FIB machine.

The invention also relates to an on-chip optical waveguide comprising at least one of input or output facets, each of said facets comprising a grid of gradually expanding unit-cells.

In an embodiment of the invention, each of said gradually expanding unit cells expands in the direction from the outer of the waveguide towards the interior of the waveguide.

In an embodiment of the invention, the gradually expanding unit cells are selected from a group comprising cones or pyramids.

In an embodiment of the invention, the gradually expanding unit cells are cones, pyramids, or a combination thereof.

In an embodiment of the invention, the gradually expanding unit cells are selected from the group comprising truncated cones, hemispherical cones, and parabolic cones.

In an embodiment of the invention, the unit cells are arranged on the facet in a staggered grid form.

In an embodiment of the invention, the unit cells are arranged on the facet in a linear grid form.

In an embodiment of the invention, the gradually expanding unit cells are engraved on the facet.

In an embodiment of the invention, the engravement of the gradually expanding unit cells is performed by a FIB machine.

DETAILED DESCRIPTION OF PREFERRED EMBODIMENTS

Figure 1:
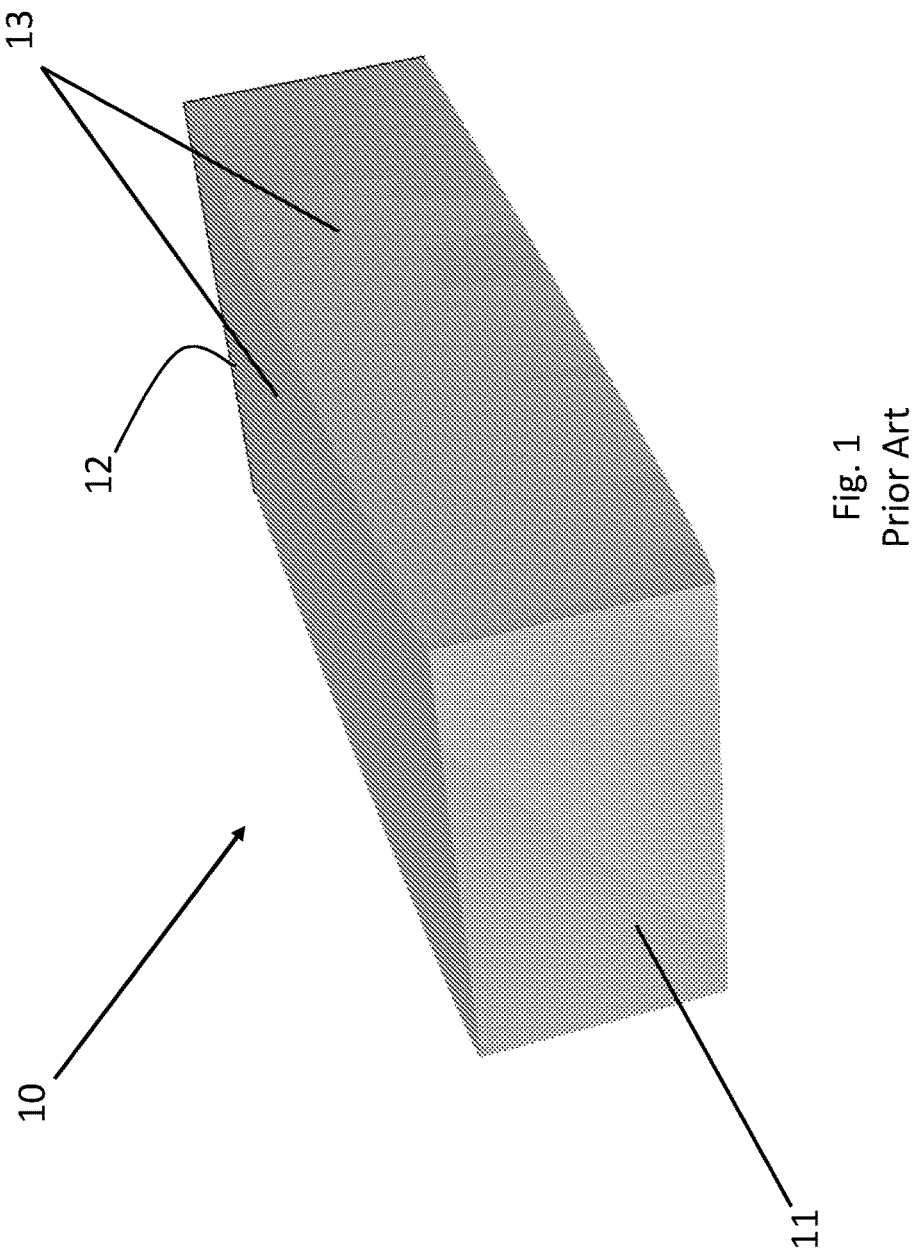
FIG. 1 shows a basic structure of a typical prior art on-chip optical waveguide.

A typical prior art on-chip optical waveguide 10 is shown in FIG. 1. The waveguide includes an input facet 11, an output facet 12, and a plurality of side facets 13. The core of the waveguide is typically made of material having a relatively high refractive index, such as Silicon, Silicon-Nitride, Gallium-Arsenide, etc. The side facets 13 are typically coated by an outer cladding layer, a material with lower refractive index than the core. As shown, the input facet 11 and similarly the output facet 12 (not seen) are smoothly polished. As a result of the relatively high refractive index of the core material, the efficiency of transfer of the waveguide is very low, particularly due to losses in the air-core interface at the input facet 11, and due to core-air interface losses at the output facet 12. The total of said losses is typically about 65% when a Silicon core is used.

Figure 2A:
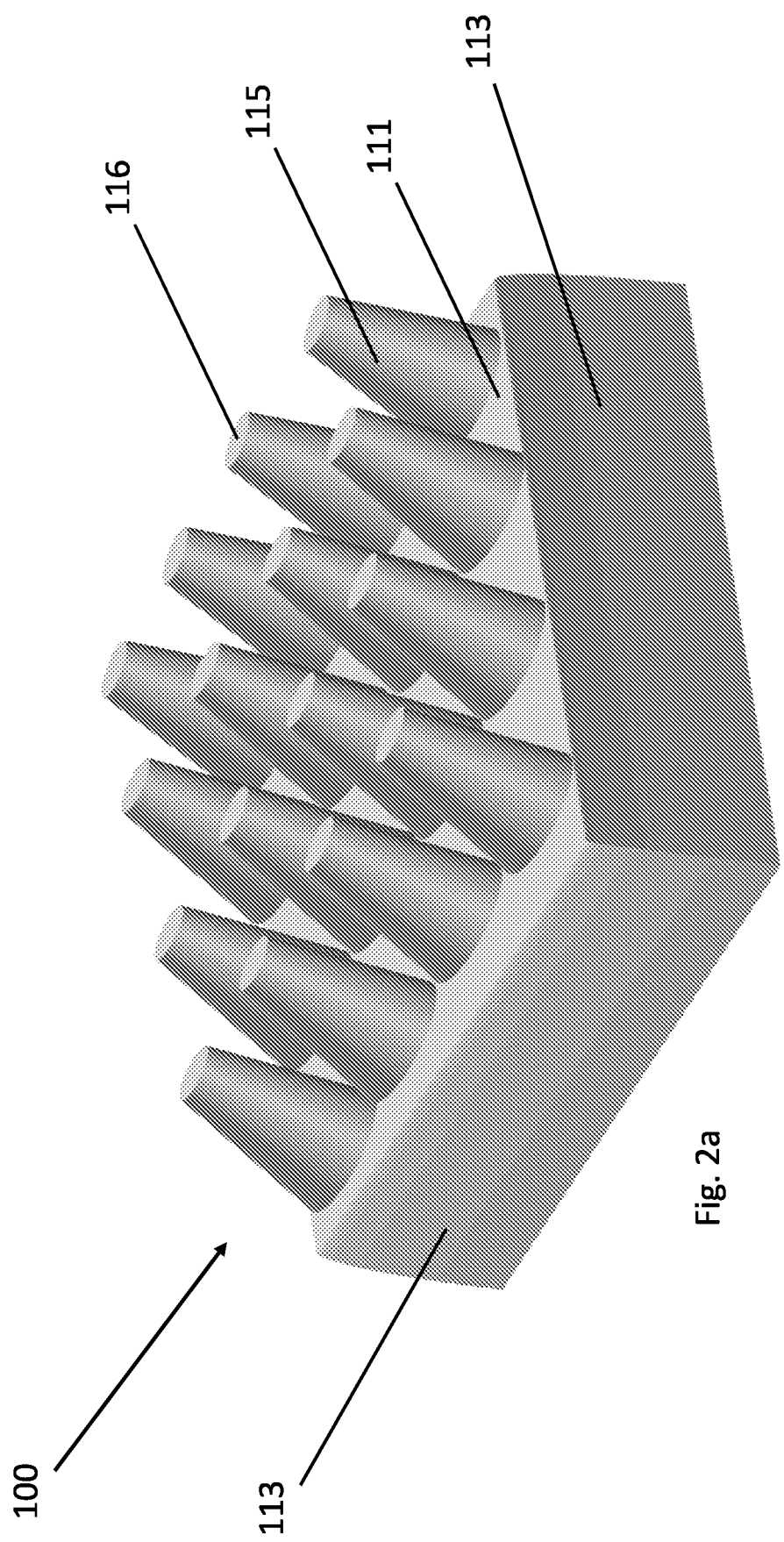
FIG. 2a illustrates a structure of a waveguide facet according to an embodiment of the invention.

The inventors have found that shaping the input (and optionally also the output) facets of the waveguide in a form of a grid of "gradually expanding elements" significantly improves the efficiency of the optical transmission through the waveguide. The term "gradually expanding elements" refers to elements such as cones, pyramids, etc. The elements (also referred to hereinafter as "unit cells") are arranged on the facets in such a manner that they expand in the direction from the air medium to the waveguide's core. As will also be discussed, the tips of the "gradually expanding elements" may have various shapes, such as, truncated, parabolic, hemispherical, etc. FIG. 2a shows an on-chip waveguide 100, according to an embodiment of the invention in which each of the gradually expanding elements 115 has a shape of a truncated cone. In similarity to the prior art waveguide of FIG. 1, the core of the waveguide 100 is made of a material having a relatively high refractive index, such as, Silicon, Silicon-Nitride, Gallium-Arsenide, etc. The side facets 113 are typically coated by an outer cladding layer, a material with lower refractive index than of the core. The input facet 111 of the on-chip waveguide is structured to include a grid of gradually expanding elements (in this case, truncated cones) 115—this is in contrast to the prior art waveguide 10 of FIG. 1 in which the input and output facets, 11 and 12 respectively, are smooth. The output facet (not shown) of the waveguide of the invention, is preferably also the same as the input facet of the waveguide 100 of FIG. 2a. As will be elaborated later in the description, this facet's structure significantly improves the efficiency of transmission through the waveguide, compared to the prior art waveguide 10 of FIG. 1 having smooth input and output facets (11 and 12 respectively). Furthermore, the transmission band of the waveguide 100 of the invention is very significantly broader compared to optical waveguides of the prior art. While in the prior art the wave-front interaction with the facet is simultaneous over the entire area of the facet, in the facet 100 of the invention having a grid of gradually expanding elements 115 the interaction of the wave-front is gradual over the area of the facet. It has been found that an increase of the density (i.e., the fill factor) of the gradually expanding elements over the area of the facet improves the efficiency of the waveguide, therefore the inclusion of as many as possible gradually expanding elements in the facet (i.e., having a grid which is as dense as possible) increases the efficiency.

Figure 2B:
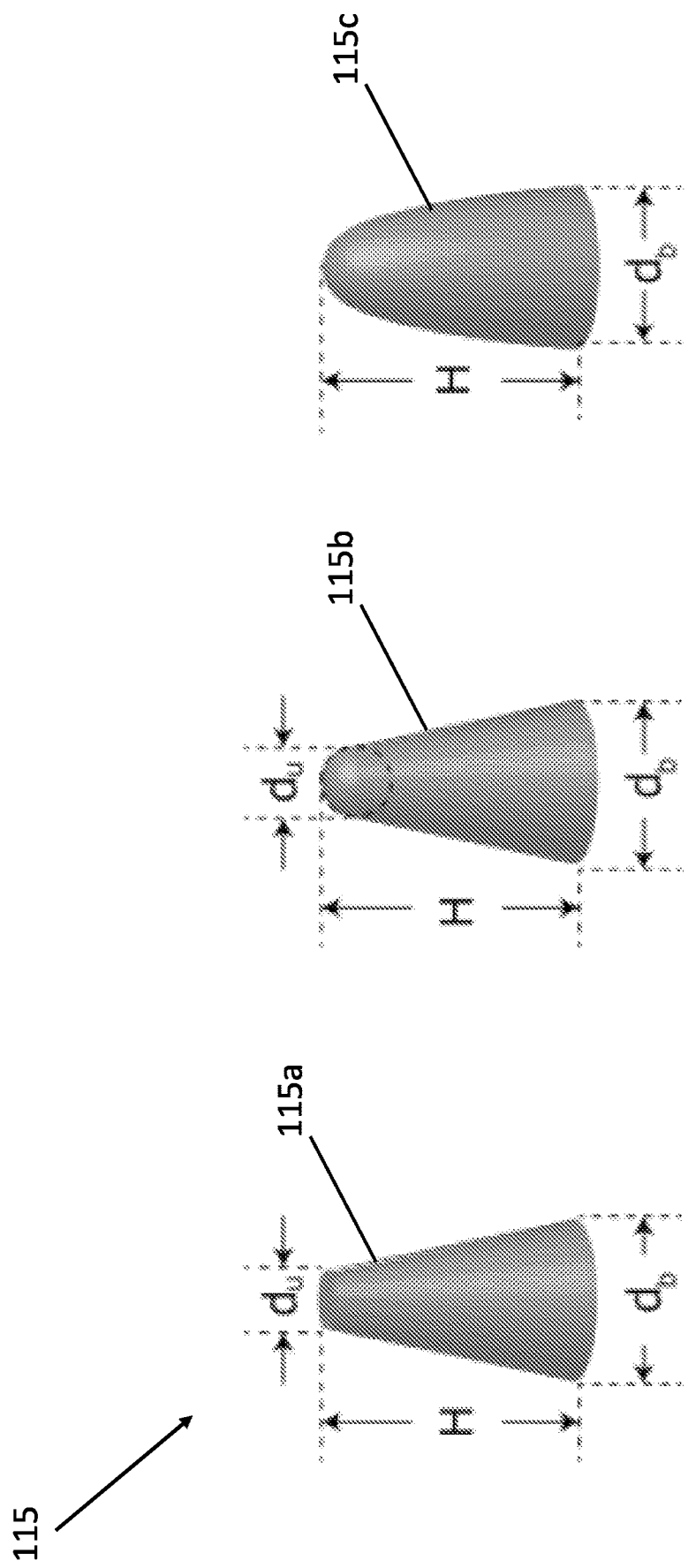
FIG. 2b illustrates various exemplary shapes of the gradually expanding elements that are disposed on the input or output facet of the waveguide.

FIG. 2b shows various exemplary shapes for the gradually expanding elements 115: a truncated cone 115a, a cone with a hemispherical tip 115b, and a parabolic cone 115c. Other gradually expanding shapes, such as pyramids, may also be used.

The input and output facets of the invention may be constructed using a FIB (Focus Ion Beam) machine. Beginning with a smooth facet (as in the prior art device 10 of FIG. 1), the FIB machine etches the facet based on a pre-programmed computer aided design (CAD), and removes material to produce a facet with a grid of gradually expanding elements. For example, a FIB machine, manufactured by Thermo Fisher Scientific, dual beam G3, was used to create the input facets having the grids of the elements shown FIG. 2b. Those facets were tested in the experiments described below.

The facet structure of FIG. 2a minimizes the reflections from the input facet (and optionally also the signal reflections from the output facet—if structured accordingly), resulting in much higher efficiency compared to prior art waveguides. Furthermore, the waveguide of the invention provides this improved transmission efficiency for a broadband light spectrum, in contrast to the prior art on-chip waveguides that provide relatively low reflections only for a single spectral line, and a relatively low efficiency in the spectrum of operation. All tries of the prior art to broaden the spectral range have failed. While developing the on-chip waveguide of the invention, the inventors have set goal to minimize the criterion of the mean value of reflection at a given spectral range, as well as to minimize the deviation value.

The following discussion elaborates on various aspects of the invention and provides numerical proof-of-concept simulations.

Figure 3B:
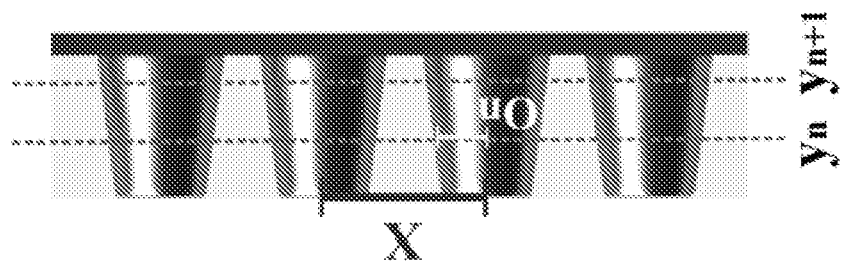
FIG. 3b shows a repetitive waveguide structure having unit cells of a same height.
Figure 3A:
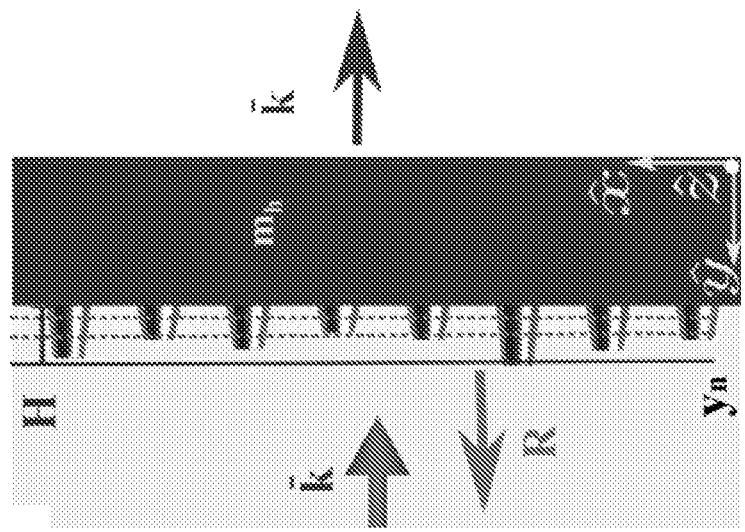
FIG. 3a shows a waveguide having unit cells of arbitrary heights.
Figure 4A:
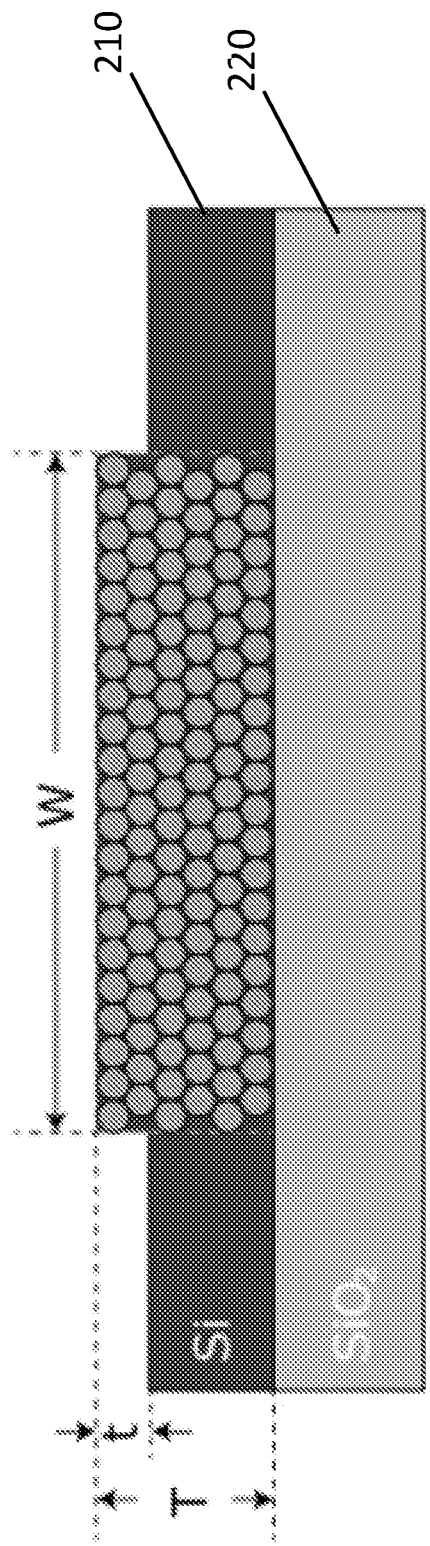
FIG. 4a shows in a schematic form an exemplary structure of a waveguide, according to an embodiment of the invention.
Figure 4B:
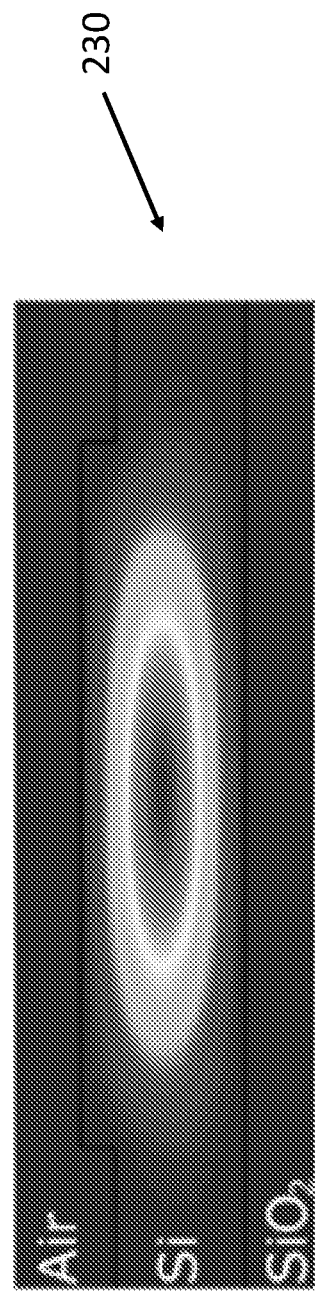
FIG. 4b shows a calculated fundamental TE mode profile as obtained for a waveguide according to an embodiment of the invention.

FIG. 3a schematically shows an arbitrarily shaped meta-surface of an engraved waveguide facet having a refractive index $m_h$. The waveguide is represented as a layered structure consisting of $y_n$ layers. An incident illumination is indicated by vector k. The light reflected from the facet is indicated by R. $\sigma_n$ is the area of a unit cell in the n'th layer made of a material having an index $m_h$. H indicates the height of the unit-cell. FIG. 4b schematically illustrates a repetitive facet structure in which X represents the period of the structure, $O_n$ represents the filling parameter. FIG. 3b shows a repetitive waveguide structure having unit cells of a same height;

All the parameters of the exemplary waveguides of FIGS. 4a and 4b, except the total width which is supposed to be very large compared to the surface variations, are small compared to the wavelength λ.

The facet is divided into infinitesimally thin layers $y_n$ as shown in FIG. 3a. Since the structure is a subwavelength structure, the formalism of effective refractive index can be used. The relations of the geometrical optics were accepted for the approximate description. Any multi-order scattering is ignored in the following approximation. It is assumed that the period of the structure is X<λ, the height is designated as H (yet is unknown), and the refractive index of the medium is $m_h$. The term $\sigma_n$ designates the part of the period filled by the medium in the $n^{th}$ layer. Then, the effective refractive index in this layer can be estimated as:

$$m_n = \frac{\sigma_n m_h + \sigma_n}{X} = 1 + (m_h - 1)\frac{\sigma_n}{X} \quad (1)$$

Considering the normal incidence, the reflection $r_n$ from the boundary between $n^{th}$ and $(n+1)^{th}$ layers is:

$$r_n = \frac{m_{n+1} - m_n}{m_{n+1} + m_n} = (m_h - 1)\frac{\sigma_{n+1} - \sigma_n}{X\left[2 + (m_h - 1)\frac{\sigma_{n+1} + \sigma_n}{X}\right]} \quad (2)$$

At the upper surface of the facet (solid line in FIG. 3a), the contribution of $r_n$ is:

$$k(y) = k_0\left[1 + (m_h - 1)\frac{\sigma(y)}{X}\right] \quad (4)$$

Now it is accepted that $y_n - y_{n-1} \to 0$ and the structure of the facet is described as a continuous medium rather than a layered meta-surface, with y instead of $y_n$ and $\sigma(y)$ instead of $\sigma_n$. The wave number k(y) can be written as:

$$R_n = r_n e^{i\int_0^{y_n} k(y')dy'} \quad (3)$$

Generally, a reflection of a layered structure is represented by the bulk relation, analysis of which is a relatively cumbersome task. Here, the inventors restricted themselves by assuming that: $|r_n| \ll 1$, and also that the transmitted wave approximately preserves its amplitude, or in other words, $|t_n| \approx 1$. In the framework of this approximation, the total reflection can be written as $R_T \approx \Sigma_n R_n$, or it can be represented by the following integral:

$$R_T \approx \frac{m_h - 1}{2X} \times \int_0^H \frac{\frac{d\sigma}{dy}}{1 + (m_h - 1)\frac{\sigma}{X}} e^{i\int_0^y k(y')dy'} dy \quad (5)$$

The absolute value of $R_T$ has to be minimized. This problem will now be considered for a single spectral line. Dealing with a fixed H, the problem can be defined as a variational one. The shape of the unit-cell represented by σ(y), will now be determined, while designating δσ as a small variation of σ(y). Then, the total reflection for this new unit-cell is:

$$R_{T\delta} \approx \frac{m_h - 1}{2X} \times \int_0^H \frac{\frac{d\sigma}{dy} + \frac{d(\delta\sigma)}{dy}}{1 + (m_h - 1)\frac{\sigma + \delta\sigma}{X}} e^{i\int_0^y k_0\left[1 + (m_h - 1)\frac{\sigma + \delta\sigma}{X}\right]dy'} dy \quad (6)$$

For performing a procedure of calculus of variations, there is one difficulty: in a vicinity of y=0, also σ≈0. In this vicinity, a Volterra series the analogue of the Tailor series for functions) cannot be used with respect to δσ. For overcoming this problem, a new function is introduced:

$$\gamma(y) = \frac{(m_h - 1)\sigma(y) + X}{X} \quad (7)$$

With an initial value of γ(0)=1. Based on this, the variation is:

$$\delta\gamma(y) = \delta\sigma(y)\frac{m_h - 1}{X} \quad (8)$$

Further, the function a is written instead of σ(y) and γ instead of γ(y). In terms of γ(y), Eq. 6 takes the form of:

$$R_{T\delta} \approx \frac{1}{2}\int_0^H \frac{\frac{d\gamma}{dy} + \frac{d(\delta\gamma)}{dy}}{\frac{X}{m_h - 1} + \gamma - 1 + \delta\gamma} e^{i\int_0^y k_0[\gamma + \delta\gamma]dy'} dy \quad (9)$$

For obtaining γ(y) in a closed form equation, it can be assumed that the function $f(y)=\int_0^y k_0\delta\gamma dy' - \delta\gamma(y)y$ is of an order smaller than ||δγ|| (o(||δγ||)), where ||δγ|| is a certain norm of δγ in the interval y∈[0,H]. While this may be incorrect for an arbitrary δγ and arbitrary y, at least for small H, the integral contribution of wrong points y are expected to be small. In the framework of the above-mentioned assumption $f(y)=\int_0^y k_0\delta\gamma dy' - \delta\gamma(y)y$, the variation of $R_{T\delta}$ is obtained as:

$$\delta R_{T\delta} = \frac{1}{2}\int_0^H \left[ ik_0 \frac{y}{\frac{X}{m_h-1}+\gamma-1}\frac{d\gamma}{dy}\delta\gamma - \frac{1}{\left(\frac{X}{m_h-1}+\gamma-1\right)^2}\frac{d\gamma}{dy}\delta\gamma + \right.$$
$$\left. -\frac{y}{\frac{X}{m_h-1}+\gamma-1}\frac{d\delta\gamma}{dy}\right]\delta\gamma e^{i\int_0^y k_0(\gamma-1)dy'}dy \quad (10)$$

after integrating the term $$\frac{1}{\frac{X}{m_h-1}+\gamma-1}\frac{d\delta\gamma}{dy}$$

by parts, the real part vanishes, and a simplified form of $\delta R_{T\delta}$ is obtained as:

$$\delta R_{T\delta} = \frac{1}{2}\int_0^H \left[ ik_0 \frac{y}{\frac{X}{m_h-1}+\gamma-1}\frac{d\gamma}{dy} - ik_0 \frac{\gamma-1}{\frac{X}{m_h-1}+\gamma-1}\frac{d\gamma}{dy}\right] + \quad (11)$$
$$\delta\gamma e^{i\int_0^y k_0(\gamma-1)dy'}dy$$

According to calculus of variations approach, $\delta R_{T\delta}=0$, thus equation (11) leads to:

$$y\frac{1}{\gamma}\frac{d\gamma}{dy} - (\gamma-1) = 0 \quad (12)$$

In the Eq. (12) the point y=0 is a problematic one, since also γ−1=0, thus (γ−1)/y is undefined at y=0. Therefore, a trajectory for integration in the complex plane is chosen. Thus, the solution γ=1+Cy is obtained, and the integration constant C can be taken as 1 without losing generality. Then, for σ(y) the following is obtained:

$$\sigma(y) = \frac{y}{m_h - 1} \quad (13)$$

Equation (13) describes a linear dependence of the y-level fill-factor on y. It shows that each unit-cell has a constant slope. This prescribes a conical or pyramidal shape of the unit-cells.

By further attempting to take into account some higher order effects, such as multiple scattering, the shape can be modified, solving numerically the wave-equation for light-guide systems. Accepting σ(H)=X, it can immediately be obtained from Eq. (13), that H=X(m$_h$−1). Therefore, the above assumption with respect to a small value of H is justified for m$_h$ close enough to 1. This justifies also the main assumption about a small value of |r$_n$|, thus the possibility of ignoring the multiple scattering. Based on the concept of gradient index, it can also be stated that the lowest reflection can be achieved by structuring the entire area of the waveguide facet with the meta-surface. This means that the optimal filling factor O$_n$ of the facet prescribes unit-cells being densely distributed on the facet. Otherwise, a step change of the refractive index is retained at the layer y$_n$=H. The arguments above also show a weak effect of the randomization of the unit-cells location on the facet: such a process generally contradicts the requirement of dense spatially-distributed unit-cells within the meta-surface. While considering structures on a waveguide facet with a high refractive index, multiple scattering should also be considered. In fact, the shape of the unit-cells should be confirmed by calculations taking into account multiple scattering contributions. A numerical solution provides this requirement. On one hand, the trapping of photons contributes to transmission, therefore, the value of the H predicted above turns out to be overestimated. It is also expected that multiple scattering contributes stronger in bottom layers than in upper ones. It is plausible to estimate the likelihood of every additional capture of a photon (and thus, contribution to transmission) by the additional factor of ρ²τ/s, where ρ is the reflectance of each unit-cell, τ is the transmittance through the meta-surface, and s is the distance between interacting unit-cells. This difference between the upper base d$_u$ and the bottom base d$_b$ (see FIG. 2b) in the multi-scattering process may be corrected by fitting the shape of the truncated cone by a paraboloid.

In the theoretical evaluations described above, it was found that a periodic lattice-made structure of densely distributed cones minimizes the reflection effect. To prove this, a full wave numerical simulator was built using Numerical Finite-Difference-Time-Domain (FDTD) solver. This simulator allowed the calculation of the optical characteristics of an arbitrary waveguide. In the numerical test, a Silicon rib waveguide having a facet structure which is schematically shown in cross-section in FIG. 4a was considered. It contains a Silicon guiding layer 210 (Si, n=3.4784) on a Silicon-Dioxide substrate 220 (SiO$_2$, n=1.444) with a rib width of W=10 μm, height of H=2.4 μm, T=2.4 μm, and a silicon nanostrip thickness t=0.5 μm. The facet included an engraved silicon metasurface made of conical-shaped unit-cells. The calculated fundamental TE mode profile 230 is shown in FIG. 4b. The study has considered the three unit-cells appearing in FIG. 2b: (a) a conical-shape cell having a truncated tip; (b) a conical-shape cell having a hemispherical tip; and (c) a conical-shape cell having a parabolic tip.

In the numerical model, a Gaussian beam with a radius of 5 μm and a divergence angle of 7.5° was launched into the waveguide. The beam was directed in parallel to the waveguide longitudinal axis, the facet was placed at a distance of 1.5 μm. The center of the beam was aligned with the center of the waveguide's guiding layer 210 such that a maximal power was incident upon the facet. This allowed modelling of the real experimental conditions, while a fibre-optic was butt-coupled to the waveguide. Since the beam spot profile was larger than the dimensions of the waveguide facet, it led to a beam-facet mismatch loss of about 1.5%. This mismatch loss was accounted for in the calculations.

Figure 5:
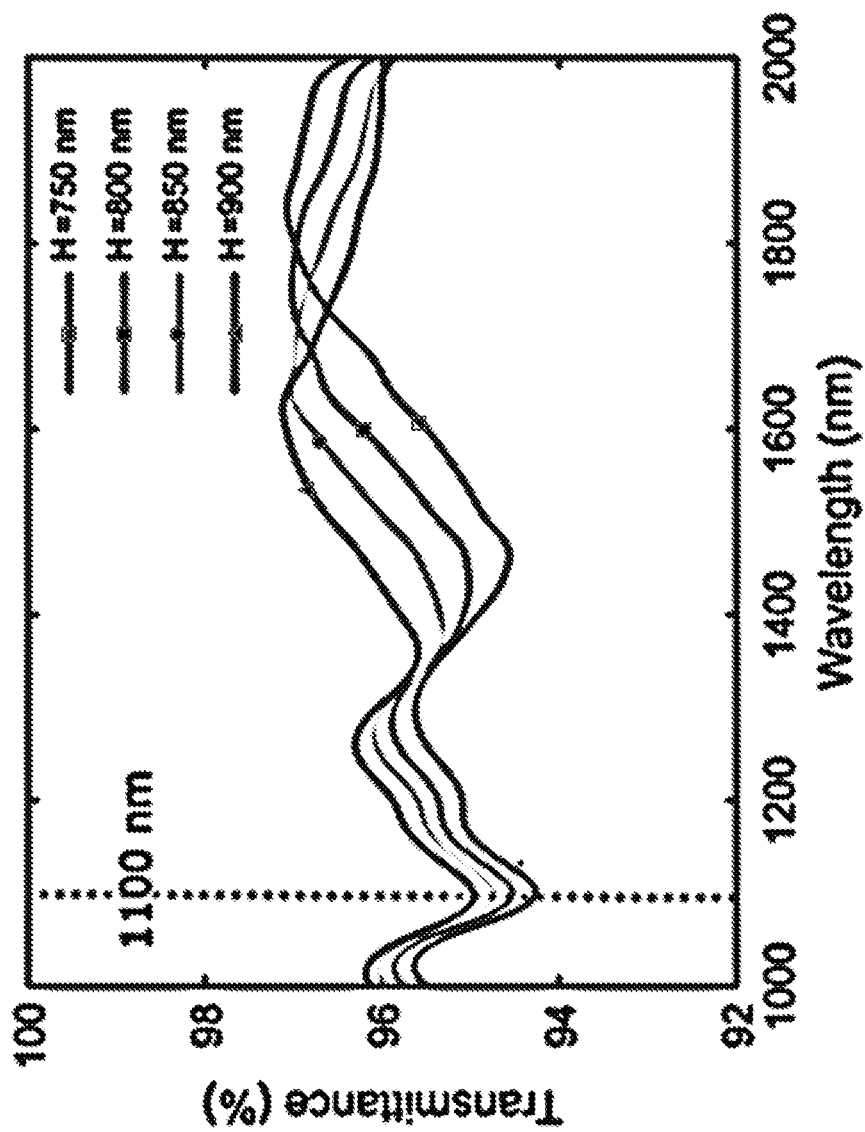
FIG. 5 shows transmission spectrum variations as a function of wavelength as obtained for a waveguide facet comprising cones of various heights.

To estimate the sensitivity of the results to different structural parameters of the conical shaped unit-cells, a rectangular lattice of truncated cones adjacent to each other was placed on a facet, and was modelled. There were two possibilities for spatially orienting the cones: (a) in a linear grid; or (b) in a staggered grid. The staggered grid structure (shown in FIG. 4a) was expected to provide better efficiency based on its larger fill-factor. Therefore, the staggered structure was selected for the numerical test. The transmission spectrum variations as a function of the wavelength for several cone heights H are shown in FIG. 5. The cone base and upper diameters were d$_b$=550 nm and d$_u$=200 nm, respectively, and they were kept constant. It can be seen that as the cone height increases, the overall average transmission increases as well. Although theoretically higher cones may produce better performance, larger aspect ratio of the cones (height vs. base diameter) is limited due to manufacturing constraints. It was also found that when the unit-cell height increases, the backward scattering is suppressed, while still allowing the angular dependence of the forward scattering effect.

Figure 6:
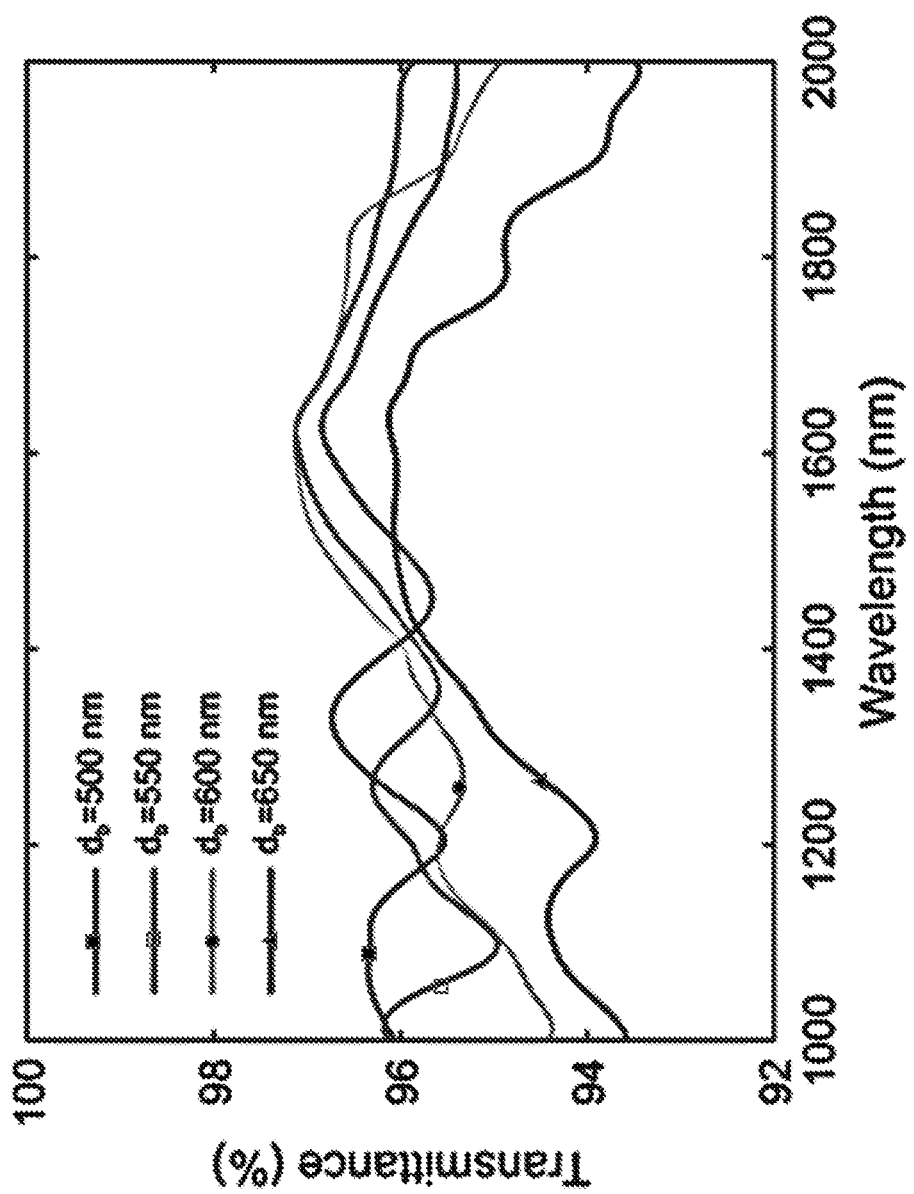
FIG. 6 shows a transmission spectrum as a function of wavelength as obtained for a rectangular facet which includes a grid of truncated cones with varying base diameters, while the height and upper diameters are fixed at H=900 nm and $d_u$=200 nm, respectively.

Next, the sensitivity of the transmission to the base diameter $d_b$ of the unit-cell was studied. FIG. 6 shows the transmission spectrum as a function of wavelength for a rectangular array of truncated cones with varying base diameters while the height and upper diameters are fixed at H=900 nm and $d_u$=200 nm, respectively. Base diameter of $d_b$=550 nm exhibits the highest transmission over the chosen spectral range with T=96.2% with H=900 nm. The base diameter is closely related to the periodicity of the structure which in turn affects the spectral behaviour of the device. One can indicate, that the sensitivity of the transmission spectrum to the base diameter $d_b$ is higher than to the upper diameter $d_u$. The change of the base diameter affects the filling factor and therefore it more affects the transmission.

A decomposition of a unit cell of the periodic grid made of truncated cones into its Fourier components yields better performance characteristics compared to the cones with hemispherical tip or of paraboloidal shape. This results from having more energy at the higher diffraction orders. The orders destructively interfere with each other causing reduction of the overall transmission. Thus, the smoothing of the sharp vertices of the cones results in a more uniform transmission in the required band.

As shown above, it has been found that the filling factor is a parameter which highly affects the performance of the waveguide facet of the invention. A staggered grid as in FIG. 4a provides the highest filling factor (for cones).

Figure 7:
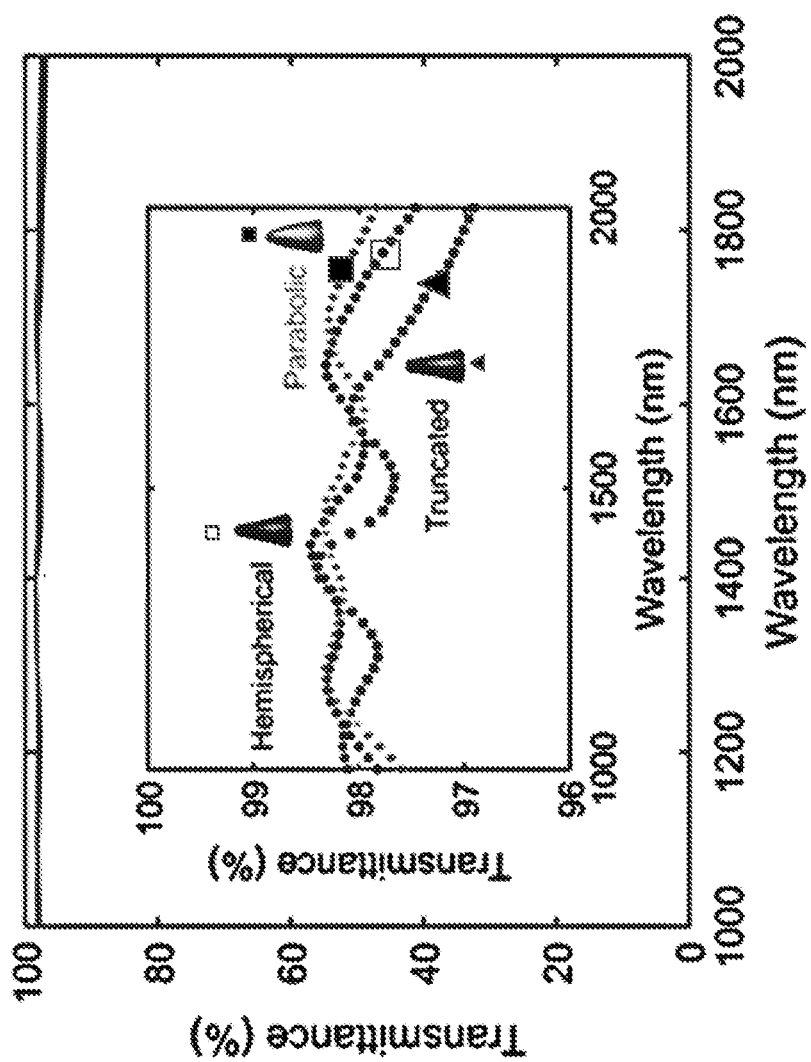
FIG. 7 shows a transmission spectrum as a function of wavelength as obtained for waveguide facets having different cone shapes, while the cones were distributed in a staggered grid.

The transmission spectrum as a function of wavelength for different cone shapes is shown in FIG. 7 (with cones distributed in a staggered grid). The conical shape unit cells had a height of H=900 nm with lower diameter of $d_b$=450 nm. This allowed comparison of the performance characteristics for different tip shapes such as truncated tip, hemispherical tip and a parabolic tip. In addition, the filling factor of the facet was maximized by decreasing the base unit-cell diameter $d_b$. As a result, the optimal base diameter leading to high transmission was found to be $d_b$=450 nm. The height and upper diameter for the truncated tip cones, was kept constant at H=900 nm and $d_u$=200 nm, respectively. The averaged transmission was as high as 98.13% in the wavelengths range from 1 μm to 2 μm using cones with parabolic tips in the staggered grid. About 1.5% out of this was lost due to a launched beam-facet mismatch.

As shown, the invention provides a facet structure for an on-chip waveguide with a transmission efficiency of more than 95% (even 98.13% was demonstrated), in comparison to an efficiency of about 51% in the prior art waveguides. Moreover, the waveguide structure of the invention provides this efficiency over a broadband spectrum, compared to a narrow spectrum of transmission in the prior art on-chip devices.

While the invention has been described with respect to a limited number of embodiments, it will be appreciated that many variations, modifications and other applications of the invention may be made. Therefore, the claimed invention as recited in the claims that follow is not limited to the embodiments described herein.

The invention claimed is:

1. An input or output facet for a unitary on-chip passive optical waveguide, the facet comprising a grid of sub-wavelength size gradually expanding unit-cells, wherein the waveguide's core and each of the unit cells are made of a material selected from Silicon, Gallium-Arsenide or Silicon-Nitride having refractive index higher than 2.0 and a structure selected from the group comprising cones, truncated cones, hemispherical cones, or parabolic cones.

2. The facet of claim 1, wherein each of the gradually expanding unit cells expands in a direction towards the facet.

3. The facet of claim 1, wherein the unit cells are arranged on the facet in a staggered grid form.

4. The facet of claim 1, wherein the unit cells are arranged on the facet in a linear grid form.

5. The facet of claim 1, wherein the gradually expanding unit cells are engraved on the facet.

6. The facet of claim 5, wherein the engravement of the gradually expanding unit cells is performed by a FIB machine.

7. A unitary on-chip passive optical waveguide comprising input or output facets, each of said facets comprising a grid of sub-wavelength size gradually expanding unit-cells, wherein the waveguide's core and each of the unit cells are made of a material selected from Silicon, Gallium-Arsenide or Silicon-Nitride having refractive index higher than 2.0 and a structure selected from the group comprising cones, truncated cones, hemispherical cones, or parabolic cones.

8. The optical waveguide of claim 7, wherein each of said gradually expanding unit cells expands in a direction towards the facet.

9. The optical waveguide of claim 7, wherein the unit cells are arranged on each side facet in a staggered grid form.

10. The optical waveguide of claim 7, wherein the unit cells are arranged on each said facet in a linear grid form.

11. The optical waveguide of claim 7, wherein the gradually expanding unit cells are engraved on each said facet.

12. The optical waveguide of claim 11, wherein the engravement of the gradually expanding unit cells is performed by FIB machine.

13. A chip comprising a plurality of unitary on-chip passive optical waveguides according to claim 7.

14. The optical waveguide of claim 7, wherein each said facet is formed to have a non-smooth patterned structure.

* * * * *